(12) United States Patent
Nakatani

(10) Patent No.: US 6,712,322 B2
(45) Date of Patent: Mar. 30, 2004

(54) PAN HEAD

(75) Inventor: Kouichiro Nakatani, Tokyo (JP)

(73) Assignee: Nihon Velbon Seiki Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/111,572

(22) PCT Filed: Apr. 24, 2001

(86) PCT No.: PCT/JP01/03492

§ 371 (c)(1),
(2), (4) Date: Apr. 26, 2002

(87) PCT Pub. No.: WO02/19025

PCT Pub. Date: Mar. 7, 2002

(65) Prior Publication Data

US 2002/0179787 A1 Dec. 5, 2002

(30) Foreign Application Priority Data

Aug. 29, 2000 (JP) ........................................ 2000-259814

(51) Int. Cl.$^7$ .............................................. F16M 11/04
(52) U.S. Cl. ................. 248/187.1; 248/177.1; 248/178.1; 248/278.1; 248/289.11; 248/291.1; 396/419; 396/428
(58) Field of Search ........................... 248/177.1, 178.1, 248/187.1, 289.11, 278.1, 291.1; 396/419, 428

(56) References Cited

U.S. PATENT DOCUMENTS

| | | | | |
|---|---|---|---|---|
| 3,006,052 A | * | 10/1961 | Stickney | 248/187.1 |
| 3,423,056 A | * | 1/1969 | Welt | 248/187.1 |
| 4,183,489 A | * | 1/1980 | Copher et al. | 248/278.1 |
| 4,647,697 A | * | 3/1987 | Koshi et al. | 564/249 |
| 4,648,698 A | * | 3/1987 | Iwasaki | 248/163.1 |
| 4,673,268 A | * | 6/1987 | Wheeler et al. | 352/243 |
| 4,697,772 A | * | 10/1987 | Kosugi et al. | 248/183.3 |
| 5,078,355 A | * | 1/1992 | Fujimoto et al. | 248/183.2 |
| 5,326,058 A | * | 7/1994 | Beaver et al. | 248/187.1 |
| 5,418,609 A | * | 5/1995 | Dunne | 356/5.01 |
| 5,419,520 A | * | 5/1995 | Ishikawa | 248/183.2 |
| 5,647,565 A | * | 7/1997 | Wei | 248/168 |
| 5,708,890 A | * | 1/1998 | Nakano | 396/428 |
| 5,938,155 A | * | 8/1999 | Garland | 248/187.1 |
| 6,164,843 A | * | 12/2000 | Battocchio | 396/419 |

FOREIGN PATENT DOCUMENTS

| | | | | |
|---|---|---|---|---|
| DE | 32 36 341 | * | 1/1981 | F16M/13/02 |
| JP | 60-120443 | | 8/1985 | |
| JP | 64-006598 | | 2/1989 | |
| JP | 3002510 | | 7/1994 | |

* cited by examiner

Primary Examiner—Ramon O. Ramirez
Assistant Examiner—Amy J. Sterling
(74) Attorney, Agent, or Firm—Morrison & Foerster LLP (57) ABSTRACT

A panhead (11) has a rotational body (21), which can be adjustably rotated around a horizontal rotation center axis (X), and a camera mount (41) adapted to revolve, as an integral body with the rotational body (21), around the rotation center axis (X) of the rotational body (21). When the camera mount (41) is set at a first position by rotating the rotational body (21) in one direction, at least a part of the camera mount (41) is located higher than the upper end portion of the rotational body (21). When the camera mount (41) is set at a second position by rotating the rotational body (21) in the other direction, the entire camera mount (41) is located lower than the upper end portion of the rotational body (21).

3 Claims, 6 Drawing Sheets

PAN HEAD

TECHNICAL FIELD

The present invention relates to a panhead to be used in the state where it is attached to a leg system, such as a tripod for a camera.

BACKGROUND OF THE INVENTION

Figure 7:
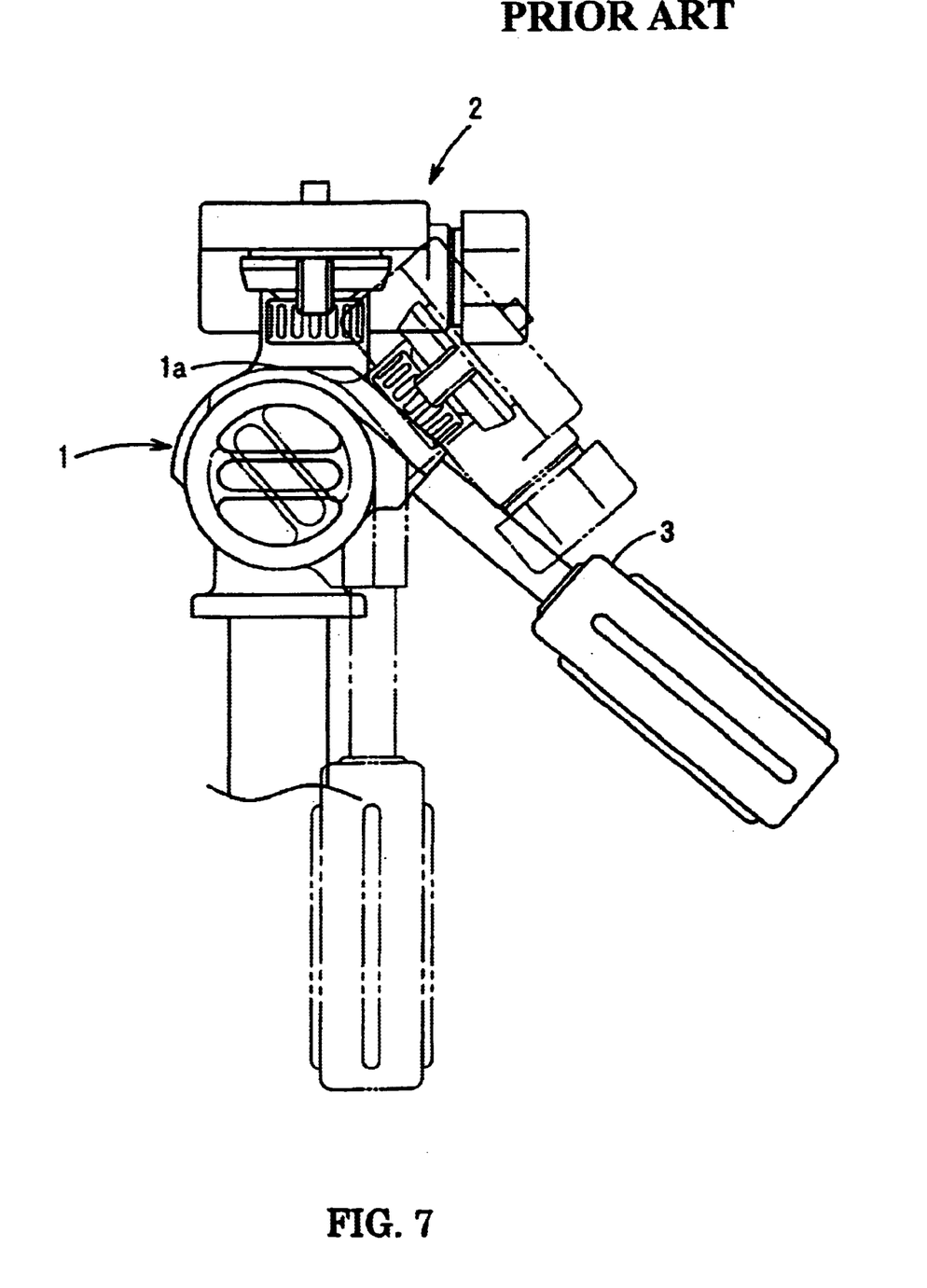
FIG. 7 is a side view of a conventional panhead.

An example of conventional panheads is shown in FIG. 7, wherein the panhead is provided with a tilting body 1 serving as a rotational body. The tilting body 1 can be adjustably rotated around a horizontally extending rotational center axis. A camera mount 2, which revolves around said rotational center axis as an integral body with the tilting body 1 is attached to the tilting body 1.

When the camera mount 2 of the panhead shown in FIG. 7 is set at a first position (the position represented by solid lines in FIG. 7) by operating a pan handle 3 to adjustably rotate the tilting body 1 in one direction, for example counterclockwise as viewed in FIG. 7, the entire camera mount 2 is at an approximately horizontal position and located higher than the upper end portion 1a of the tilting body 1.

When the camera mount 2 is set at a second position (the position represented by two-dot chain lines in FIG. 7) by operating the pan handle 3 to adjustably rotate the tilting body 1 in the other direction (clockwise as viewed in FIG. 7), a part of the camera mount 2 (the left half as viewed in FIG. 7) is located higher than the upper end portion 1a of the tilting body 1, while the remaining part of the camera mount 2 (the right half as viewed in FIG. 7) is located lower than the upper end portion 1a of the tilting body 1.

However, the panhead shown in FIG. 7 presents problems in that a half of the camera mount 2 inevitably projects upward from the tilting body 1 even when the camera mount 2 is set at the second position. In other words, it cannot be made sufficiently compact.

For example, when stowing the panhead into a bag in the state that the panhead is still mounted on a tripod, the part of the camera mount 2 projecting from the tilting body 1 may obstruct its stowage in the bag.

As the part of the camera mount 2 projecting from the tilting body 1 may become a hindrance also when, for example, leaving the panhead in a room in the state that the panhead is still mounted on a tripod, the panhead shown in FIG. 7 may limit where it is placed.

In order to solve the above problems, an object of the present invention is to provide a panhead which ensures a sufficient height to take pictures when in use, and can be made sufficiently compact when not in use.

DISCLOSURE OF THE INVENTION

A panhead according to the present invention includes a rotational body, which can be adjustably rotated around a horizontal rotation center axis, and a camera mount which is provided as a part of said rotational body and adapted to revolve, as an integral body with the rotational body, around said rotation center axis of the rotational body, wherein the panhead is structured such that when the camera mount is set at a first position by rotating the rotational body in one direction, at least a part of the camera mount is located higher than the upper end portion of the rotational body and that when the camera mount is set at a second position by rotating the rotational body in the other direction, the entire camera mount is located lower than the upper end portion of the rotational body.

According to the invention, rotational adjustment of the rotational body causes at least a part of the camera mount to be positioned higher than the upper end portion of the rotational body or the entire camera mount to be positioned lower than the upper end portion of the rotational body. Therefore, the panhead according to the invention is ensured of having a sufficient shooting height when in use and can be made sufficiently compact when not in use.

A panhead according to another feature of the present invention includes a base body to be connected to the upper end portion of a leg system, a rotational body which is provided as a part of the base body and can be adjustably rotated around a horizontal rotation center axis, an operating handle projected from said rotational body and formed in the shape of a long bar extending in such a direction as to intersect with said rotation center axis of the rotational body, said operating handle being adapted to rotate, as an integral body with the rotational body, around the rotation center axis of the rotational body by receiving a given force when said rotational body is adjustably rotated, and a camera mount which is provided as a part of said rotational body and adapted to revolve, as an integral body with the rotational body, around said rotation center axis of the rotational body. The rotational body has a body portion rotatably connected to the aforementioned base body, and a projecting portion projecting upward from the body portion. The aforementioned camera mount is attached to one side of said rotational body. When the camera mount is set at a first position by rotating said rotational body in one direction until the lengthwise direction of the operating handle intersects with the lengthwise direction of the leg system, the camera mount is at a given distance from a location directly above the base body towards the side from which said projecting portion projects, with at least a part of the camera mount being located higher than the upper end portion of the rotational body. When the camera mount is set at a second position by rotating said rotational body in the other direction so that the operating handle and the leg system extend in parallel with each other, the camera mount is at a given distance from a location directly above the base body towards the side from which said projecting portion projects, with the entire camera mount being located lower than the upper end portion of the rotational body.

With the configuration as above, by rotating the rotational body with the operating handle, at least a part of the camera mount attached to the projecting portion of the rotational body can be positioned higher than the upper end portion of the rotational body, or the entire camera mount can be positioned lower than the upper end portion of the rotational body. Therefore, the panhead is ensured of having a sufficient shooting height when in use and can be made sufficiently compact when not in use.

A panhead according to yet another feature of the invention is characterized in that the rotational body has a flat surface formed on the side opposite the surface from which the operating handle is projected, and that the operating handle is positioned to cause its lengthwise direction to intersect with said flat surface.

According to the above feature of the present invention, the operating handle is provided so that its lengthwise direction intersects with the flat surface of the projecting portion of the rotational body. Therefore, when the operating handle is positioned such that its lengthwise direction becomes parallel to the length of the leg system, the flat surface of the projecting portion of the rotational body constitutes one of the lengthwise ends of the leg system, thereby permitting the panhead to be neatly stowed into a bag or the like.

PREFERRED EMBODIMENT OF THE INVENTION

Next, the structure of an embodiment of a panhead according to the present invention is explained hereunder, referring to the relevant drawings.

FIGS. 1 through 5 show the entire panhead 11 in a horizontal shooting position, where the camera lens faces the front. The panhead 11 is intended to be mounted on, for example, a panhead mounting portion 13 formed on the top of a leg system 12, such as a camera tripod or the like, so as to secure the camera, which is not shown in the drawings. The function of the panhead 11 permits the camera lens to be positioned in any desired orientation vertically or laterally in accordance with the position of the subject to be photographed while the leg system 12 is kept fixed.

Figure 5:
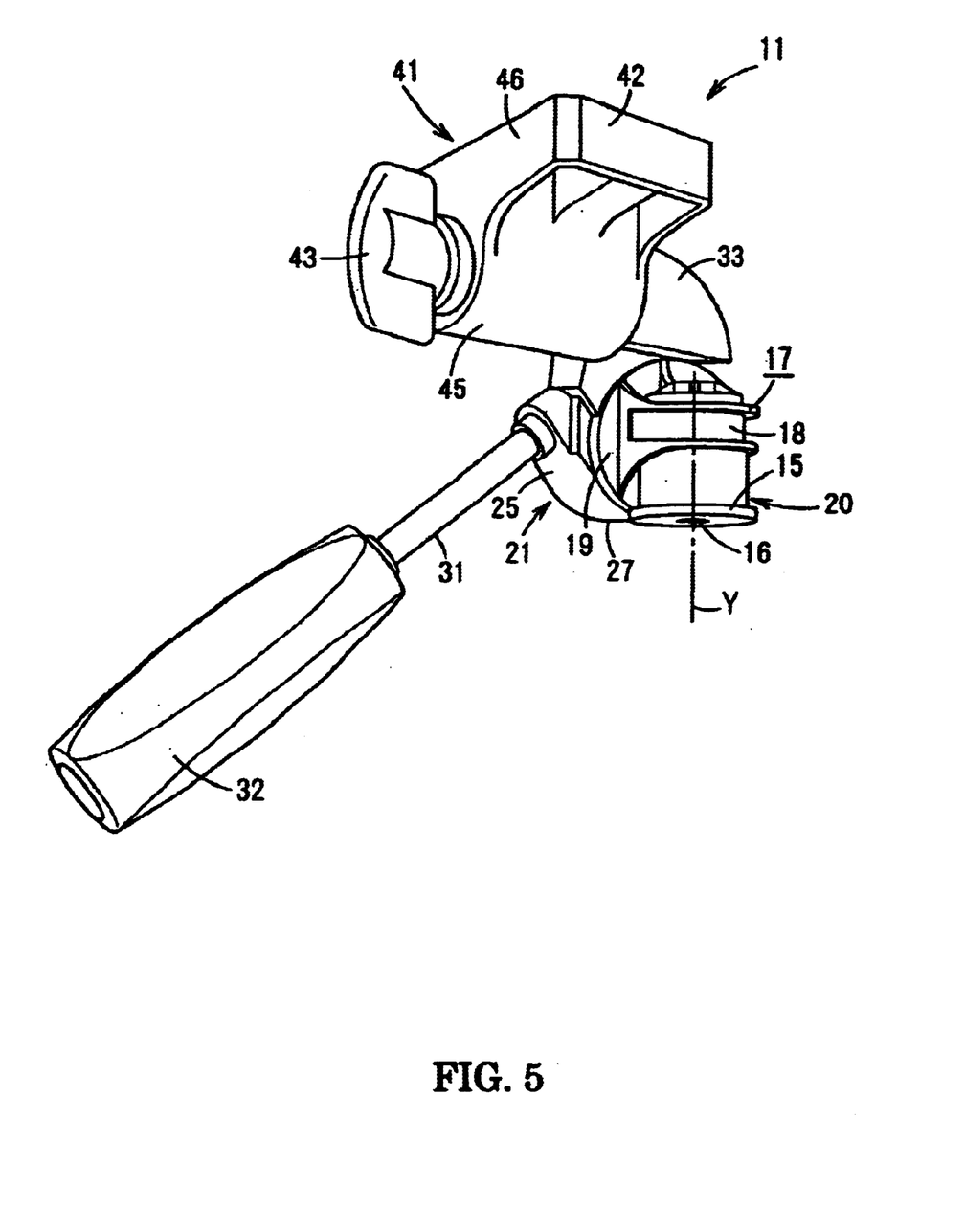
FIG. 5 is a perspective of said panhead viewed diagonally from the rear.

As shown in FIG. 5, the panhead 11 includes a leg connecting member 15 having a column-like shape with its bottom having a greater diameter. A threaded hole 16 serving as a connecting hole is formed in the bottom of the leg connecting member 15. A male screw (not shown) of panhead mounting portion 13 of the leg system 12 is screwed in the threaded hole 16. A panning body 17 serving as a rotational body is provided around the cylindrical outer surface of the panning shaft portion (not shown) of the leg connecting member 15 in such a manner that the panning body 17 can be adjustably rotated around the rotation center axis Y, which extends vertically, in other words along an imaginary line that coincides with the center axis of the panning shaft portion (not shown).

A cylindrical connector portion 18 open at the bottom is formed at one side (the right side) of the panning body 17 and fitted around the panning shaft portion (not shown). Thus, the connector portion 18 is rotatably connected to the panning shaft portion. Another connector portion 19, which may be a tilting shaft portion having a column-like shape, is formed at the other side (the left side) of the panning body 17. A tilting body 21 serving as another rotational body is fitted around the cylindrical outer surface of the connector portion 19 in such a manner that the tilting body 21 can be adjustably rotated around the rotation center axis X, which extends laterally, in other words along an imaginary horizontal line that coincides with the center axis of the connector portion 19. The panning body 17 and the leg connecting member 15 together constitute a base body 20, to which the upper end portion of the leg system 12 is removably connected.

Figure 2:
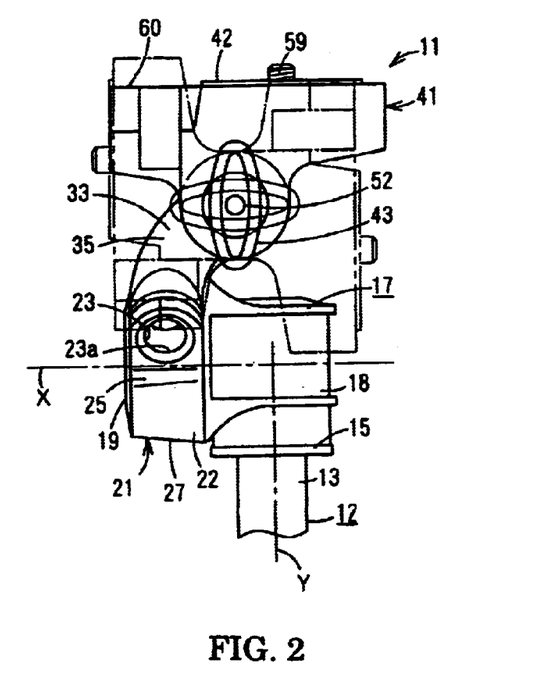
FIG. 2 is a rear view of said panhead.

The tilting body 21 has a generally cylindrical body portion 22, which is rotatably fitted around the surface of the connector portion 19 of the panning body 17. The bottom of the body portion 22 is formed in an arc shape. A generally cylindrical handle connecting hole 23 open at both ends is bored through the upper end portion of the body portion 22. As shown in FIG. 2, one of the openings of the handle connecting hole 23, i.e. the opening 23a, opens in the upper part of one of the flat surfaces of the body portion 22, i.e. the rear face 25, in such a way that the opening 23a faces rearward with respect to the panhead 11, in a downwardly inclined direction. The opening 23b of the handle connecting hole 23 opens in the upper part of the other flat surface of the body portion 22, i.e. the front face 26 located opposite the rear face 25 in such a way that the opening 23b faces forward with respect to the panhead 11, in an upwardly inclined direction. The body portion 22 is formed such that the bottom edges of its front and rear faces 26,25 extend parallel to each other until they respectively connect to the two opposing edges of the bottom end face 27 as an integral, contiguous body therewith. Said bottom end face 27 of the body portion 22 is formed in a curved surface in the shape of a half arc.

A panning handle 31 serving as an operating handle is rotatably connected to the body portion 22, with the base end portion, i.e. the upper end portion, of the panning handle 31 inserted in the handle connecting hole 23. The remaining part of the panning handle 31 (the entire panning handle except for the base end portion) projects from the rear face 25 of the tilting body 21 in a given direction, i.e. rearward with respect to the panhead, at a downwardly inclined direction.

The panning handle 31 is formed in the shape of a long bar having a circular section and extending in such a direction as to intersect with the rotation center axis X of the tilting body 21. A holder member 32 is fixed to the lower end portion, i.e. the end located opposite the base end, of the panning handle 31.

By rotating the panning handle 31 in either direction while holding the holder member 32, the tilting body 21 can be fixed to or disengaged from the panning body 17. By operating the panning handle 31 while holding the holder member 32 so that the furthermost end of the panning handle 31 moves vertically and laterally around the base end, it is possible to rotate the tilting body 21 upward or downward, as well as forward or backward, around the rotation center axis X, while horizontally rotating the panning body 17 around the rotation center axis Y together with the tilting body 21.

The tilting body 21 has a projecting portion 33, which is formed integrally with the body portion 22 and projects upward from the upper part of the body portion 22, in other words the vicinity of the handle connecting hole 23 of the body portion 22.

Figure 3:
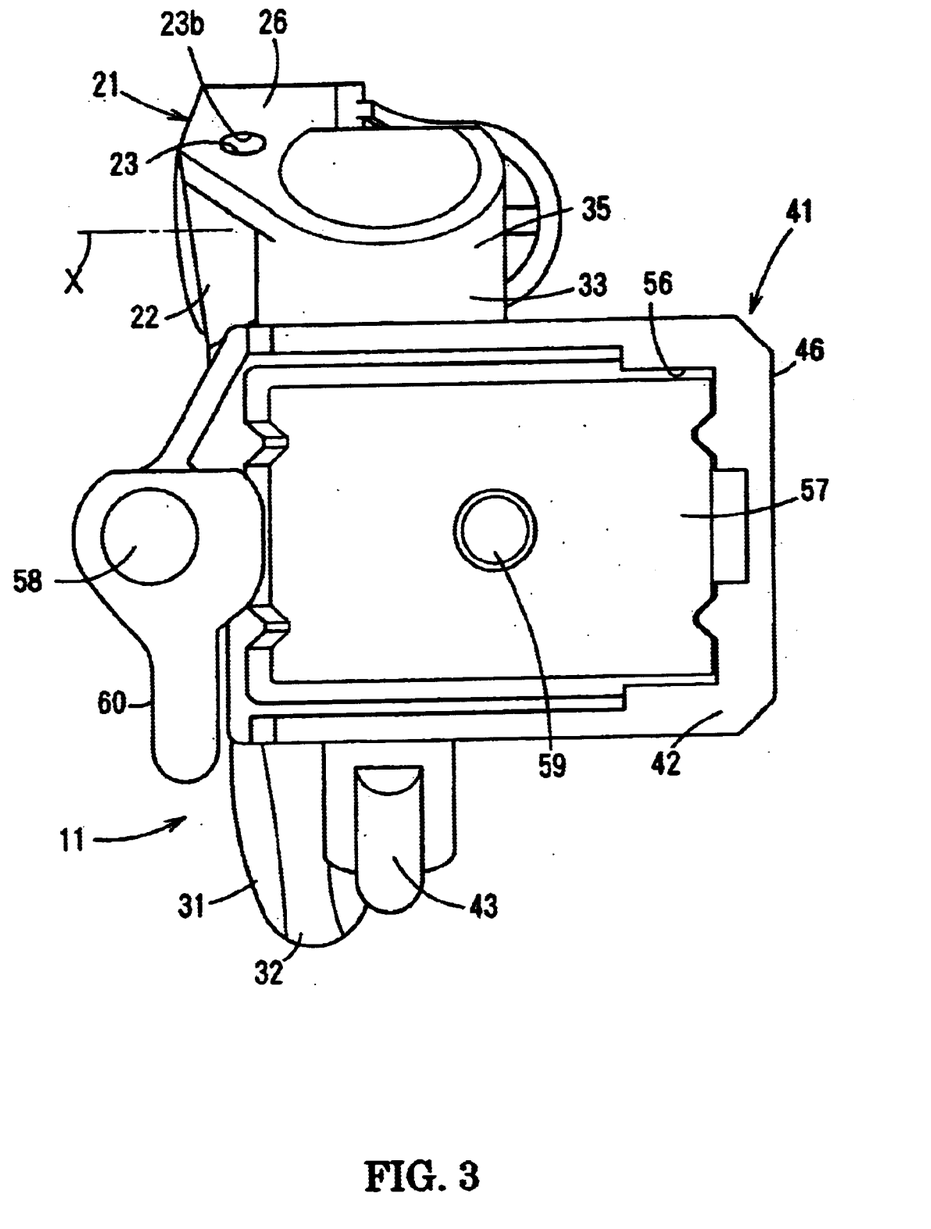
FIG. 3 is a plan view of said panhead.
Figure 4:
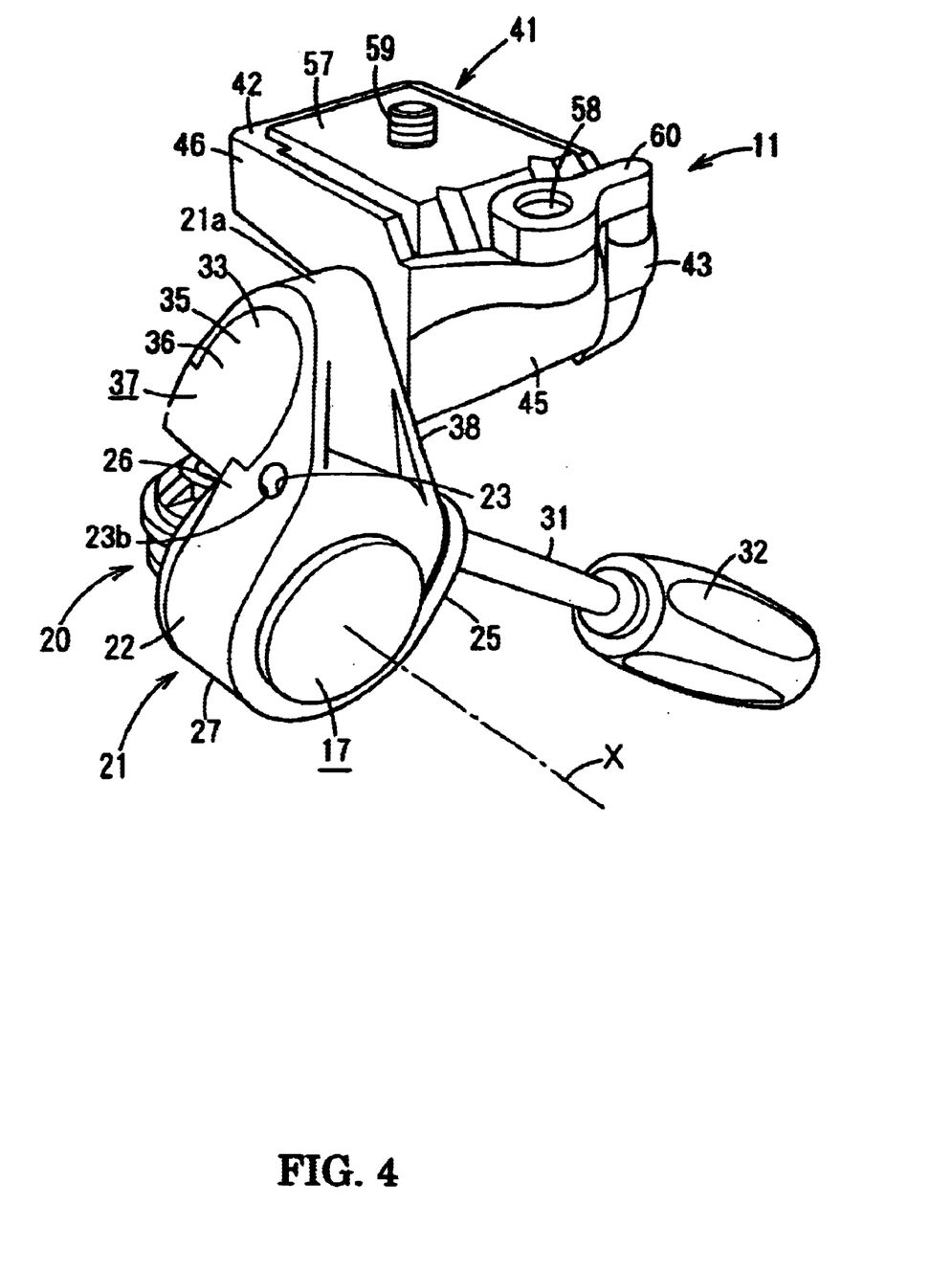
FIG. 4 is a perspective of said panhead viewed diagonally from the front.

As shown in FIGS. 3 and 4, the projecting portion 33 has a connector portion 35 in the shape of a short, horizontally truncated cylinder so that its cross section consisting of an arc and a horizontally extending base. One of the lengthwise ends of the connector portion 35 is formed into a slanted surface 36, which is gradually angled from the top to the bottom, in the forward direction with respect to the panhead 11. The slanted surface 36 of the connector portion 35 is flush with the front face 26 of the body portion 22 so that the slanted surface 36 and the front face 26 together form a flat surface 37. The flat surface of the tilting body 21 is so positioned as to be perpendicular to the length of the panning handle 31, i.e. the axis of the panning handle 31.

Figure 6:
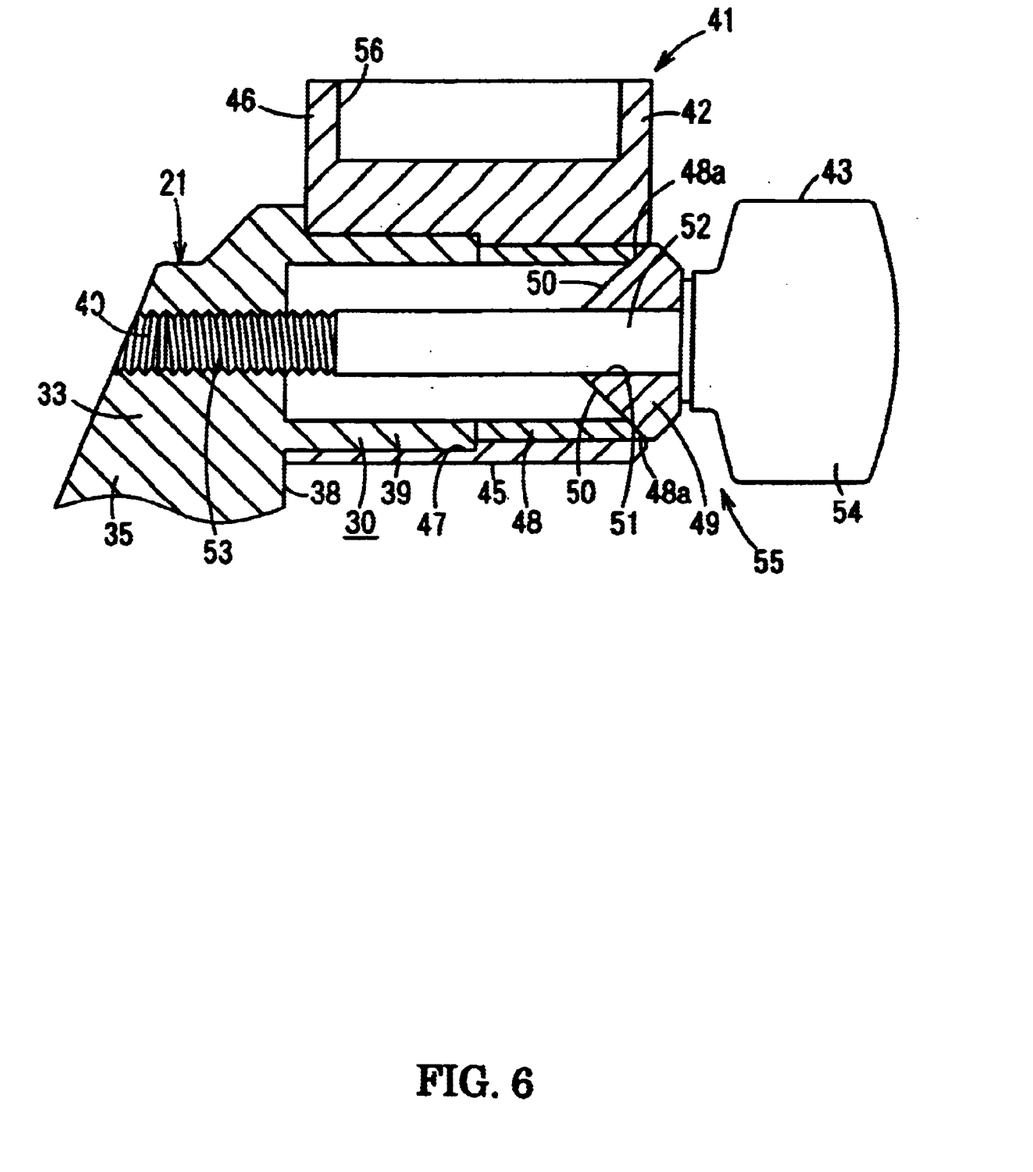
FIG. 6 is an enlarged sectional view of a part of said panhead.

The other lengthwise end of the connector portion 35, which constitutes a part of the projecting portion 33, is a vertical surface 38 having a cylindrical supporting shaft portion 39, which serves as a mounting portion. As shown in FIG. 6, the supporting shaft portion 39 is formed as an integral body with the connector portion 35 and projects from the vertical surface 38. A screw hole 40 is formed in the connector portion 35 in such a way that the screw hole 40 extends from the vertical surface 38 into the connector portion 35 and directly communicates with the inside of the supporting shaft portion 39. A cylindrical distendable member 48 is fixed, coaxially with the supporting shaft portion 39, to the outer end of the supporting shaft portion 39. The supporting shaft portion 39 and the distendable member 48 thus fixed to each other as an integral body constitute a side-tilting shaft 30.

A camera mount 41 is fitted around the side-tilting shaft 30 so as to be adjustably rotated around the center axis of the side-tilting shaft 30 within a given range, for example an area that covers a 180° arc. As shown in FIG. 2, the side-tilting shaft 30 is disposed above the middle of the width of the base body 20, in other words the midpoint in the lateral direction of the pan head 11, as viewed from one direction as mentioned in the claims, i.e. behind the panhead 11.

The camera mount 41 includes a side-tilting base 42, which may be of a quick shoe type, and a side-tilt locking knob 43 serving as an operating member to be operated when fixing the side-tilting base 42 to the tilting body 21.

As shown in FIG. 2, the side-tilting base 42 functions to tilt the camera sideways to the right or left of the panhead 11 from the horizontal position, where the camera is kept horizontal; the side-tilting base 42 can be set at the horizontal position, the right-vertical position, or the left-vertical position, depending on the subject to be photographed.

The side-tilting base 42 includes a generally cylindrical fitting connector portion 45, which forms the lower part of the side-tilting base 42 and is open at both ends, and a receiving platform portion 46, which is in the shape of a generally rectangular plate and forms the upper part of the side-tilting base 42. The fitting connector portion 45 and the receiving platform portion 46 are formed as an integral body.

As shown in FIG. 6, the supporting shaft portion 39 of the side-tilting shaft 30 of the tilting body 21 is rotatably fitted in a part of the inside of the fitting connector portion 45 of the side-tilting base 42, i.e. the left-side part of the fitting connector portion 45 as viewed in FIG. 6. The side-tilting shaft 30 is positioned with the positioning portion at the end of the supporting shaft portion 39 in contact with a stepped portion 47, which is formed along the inner surface of the fitting connector portion 45.

The distendable member 48 formed of a generally cylindrical flexible member, such as a collet, is fitted in the other part of the fitting connector portion 45. A movable member 49 formed of a cone having a frustum-like shape or any other appropriate member is fitted to the outer rim of the distendable member 48. A tapered pushing surface 50 is formed along the cylindrical outer surface of the movable member 49. An insertion hole 51 that extends in the axial direction of the supporting shaft portion 39 of the projecting portion 33 and passes through the movable member 49 is formed at the center of the movable member 49. A shaft portion 52 of the side-tilt locking knob 43 is inserted in the insertion hole 51 and the fitting connector portion 45. A threaded portion 53 at the end of the shaft portion 52 of the side-tilt locking knob 43 is screwed in the screw hole 40 of the connector portion 35 of the projecting portion 33.

When the side-tilt locking knob 43 is rotated in one direction so as to be tightened by turning a tab portion 54 of the side-tilt locking knob 43, the movable member 49 moves together with the side-tilt locking knob 43 in a given direction, i.e. to the left as viewed in FIG. 6.

The movement of the movable member 49 causes the pushing surface 50 of the movable member 49 to push outward a tapered pushing-force receiving surface 48a, which is formed on the distendable member 48 at a location facing the pushing surface 50, so that the distendable member 48 flares outward. As a result, the cylindrical outer surface of the distendable member 48 is pressed against the inner surface of the fitting connector portion 45 of the side-tilting base 42, thereby fixing the side-tilting base 42 to the side-tilting shaft 30 of the tilting body 21 with the side-tilt locking knob 43 positioned there between. Thus, the side-tilting base 42 is locked and thereby prevented from rotating against the side-tilting shaft 30 of the tilting body 21.

When the side-tilt locking knob 43 is rotated in the other direction so as to be loosened by turning the tab portion 54, the movable member 49 moves together with the side-tilt locking knob 43 in a given direction, i.e. to the right as viewed in FIG. 6.

The movement of the movable member 49 releases the distendable member 48 from the pushing force of the pushing surface 50 of the movable member 49 so that the distendable member 48 returns to the original shape. As a result, the cylindrical outer surface of the distendable member 48 and the inner surface of the fitting connector portion 45 of the side-tilting base 42 are released from the press-contact with each other, so that the side-tilting base 42 is released from engagement with the tilting body 21. The side-tilting base 42, the movable member 49, and other relevant members constitute a fixing means 55 for fixing the side-tilting base 42 and the tilting body 21 to each other.

A housing recess 56 is formed in the top of the receiving platform portion 46 of the side-tilting base 42, and a camera securing member 57 is removably fitted in the housing recess 56. Said camera securing member 57 consists of a shoe or the like in the shape of a generally rectangular plate corresponding to the shape of the housing recess 56.

The camera securing member 57 contained in the housing recess 56 as described above is provided with a screw 59, which is attached to the center of the camera securing member 57 in such a manner that the axis of the screw 59 extends vertically. In this state, the camera securing member 57 is fixed to the side-tilting base 42 by means of a cam lever 60, which is rotatably supported by a supporting shaft 58 of the receiving platform portion 46. By rotating the cam lever 60 in a given direction around the supporting shaft 58, the camera securing member 57 and the side-tilting base 42 are released from each other. The camera securing member 57, which is attached to the back of the camera (not shown), can be fixed to the side-tilting base 42 by merely being pushed from above into the housing recess 56 of the side-tilting base 42. In other words, the camera can be mounted on the panhead 11 with a single action, without the need of rotation of the cam lever 60.

Next, how to take a picture by a camera attached to the panhead described above mounted on a leg unit, which is a camera tripod, is explained hereunder.

After the camera securing member 57 has been removed from the side-tilting base 42 and attached to the back of the camera (not shown) with the screw 59 beforehand, the camera is mounted on the panhead 11 by snugly pushing the camera securing member 57 into the housing recess 56 of the side-tilting base 42.

The side-tilting base 42 and the tilting body 21 are then released from each other by rotating the side-tilt locking knob 43. Thereafter, together with the camera which is held by hand, the side-tilting base 42 is rotated around the side-tilting shaft 30 in a given direction to set the camera at the horizontal position, the right-vertical position, or the left-vertical position.

By rotating the panning handle 31, the tilting body 21 and the panning body 17 are rotated to adjust their positions. Other adjustment is also performed, including adjustment of the spread angle and the lengths of the legs of the camera tripod, as well as adjustment of the height of the vertically movable support attached to the supporting shaft portion that supports the three legs of the tripod. After the direction of the camera lens is thus set at a given direction according to the subject to be photographed, in other words the picture composition, the shutter of the camera is released.

Figure 1:
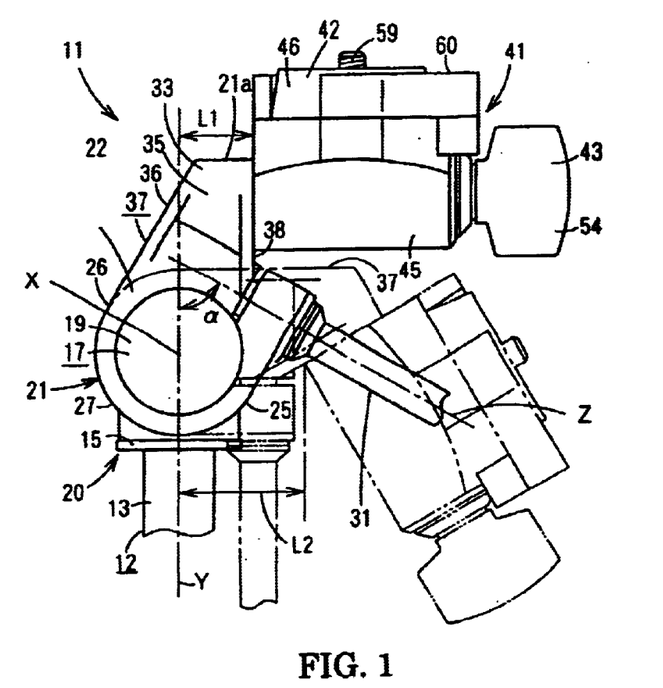
FIG. 1 is a side view of an embodiment of a panhead according to the present invention.

Let us take as an example a case where the side-tilting base 42 is set so that the camera is in the horizontal position. The tilting body 21 may be rotated in this state in one direction (counterclockwise as viewed in FIG. 1) as shown in solid lines in FIG. 1 so that the length of the panning handle 31 and the length of the leg system 12 intersect with each other, in other words, the rotation center axis Z extending along the length of the panning handle 31 and the rotation center axis Y of the panning body 17 intersect with each other at a given angle (for example, the given angle α=60° when viewed from a side as shown in FIG. 1). Thus, the camera mount 41 is set at a given position, i.e. the first position.

In this state, the entire camera mount 41 is at a given distance from a location directly above the base body 20 in the direction in which the back of the panhead 11 faces, i.e. in the aforementioned one direction in which the panning handle 31 is projected. To be more specific, as shown by solid lines in FIG. 1, the front end of the camera mount 41 is at a given distance L1 from the rotation center axis Y of the panning body 17 of the base body 20 as viewed from the side.

At least a part of the camera mount 41, for example the upper half, is located higher than the upper end portion 21a of the tilting body 21, thereby ensuring that the camera has a sufficient shooting height. Because of the projecting portion 33 projecting upward from the body portion 22 of the tilting body 21, the height of the camera securing member 57 of the camera mount 41 is greater than that of the conventional panhead shown in FIG. 7 by the distance by which the projecting portion 33 projects from the body portion 22. Said height of the camera securing member 57 is measured based on the location of the bottom end of the base body 20. The greater height of the camera securing member 57 results in greater extension of the panhead 11, thereby ensuring that the camera has a sufficient shooting height.

Pictures can be taken in this state. Thereafter, the camera mount 41 can be set at a given not-in-use position, i.e. the second position, by removing the camera from the panhead 11 and rotating the tilting body 21 in the other direction (clockwise as viewed in FIG. 1) as shown in two-dot chain lines in FIG. 1 until the lengthwise direction of the panning handle 31 and the lengthwise direction of the leg system 12 become parallel to each other, in other words, until the rotation center axis Z extending along the length of the panning handle 31 and the rotation center axis Y of the panning body 17 become parallel to each other.

In this state, the entire camera mount 41 is at a given distance from a location directly above the base body 20 in the direction in which the back of the panhead 11 faces, i.e. in the aforementioned one direction in which the panning handle 31 is projected. To be more specific, as shown by two-dot chain lines in FIG. 1, the front end of the camera mount 41 is at a given distance L2 (L2>L1) from the rotation center axis Y of the panning body 17 of the base body 20 as viewed from the side. The distance L2 may be, for example, approximately twice the distance L1.

As the camera mount 41 is maintained at a low position where the entire camera mount 41 is prevented from protruding above the flat surface 37, which forms the upper end portion of the tilting body 21. As the panhead 11 as a whole is consequently made compact, the total length of the camera tripod, on which the panhead 11 is mounted, is reduced.

As described above, according to the structure of the panhead 11, at least a part of the camera mount 41 attached to the projecting portion 33 of the tilting body 21 can be positioned above the upper end portion of the tilting body 21, or the entire camera mount 41 is positioned lower than the upper end portion of the tilting body 21 by adjustably rotating the tilting body 21 with the panning handle 31. Therefore, compared with the conventional panhead shown in FIG. 7, the panhead 11 is ensured of having a sufficient shooting height when in use and can be made sufficiently compact when not in use.

With the configuration as above, the panhead 11 according to the embodiment is capable of appropriately coping with the height of the subject to be photographed. Furthermore, compared with the conventional structure shown in FIG. 7, the panhead 11 is more convenient to carry, because it can be stowed more easily into a bag either alone or mounted on a leg system, such as a tripod. In cases where the panhead 11 according to the embodiment is left in a room either alone or still mounted on a tripod, the panhead 11 imposes fewer limitations on where it can be placed, compared with the conventional panhead shown in FIG. 7.

The panning handle 31 is positioned perpendicularly to the flat surface 37 of the projecting portion 33 of the tilting body 21. Therefore, when the panning handle 31 is positioned such that its lengthwise direction extends in parallel to the lengthwise direction of the leg system 12, the flat surface 37 of the projecting portion 33 of the tilting body 21 constitutes one of the lengthwise ends (the upper end as viewed in FIG. 1) of the leg system 12. Because of this feature, the panhead 11 can be smoothly stowed into a bag in the state it is mounted on a leg system, such as a tripod, by, for example, bringing the flat surface 37 of the panhead 11 into contact with the inner surface of the bag.

The above explanation refers to the present embodiment, wherein the panhead 11 is intended to be mounted on a camera tripod. However, even in cases where the panhead is attached to a stand having only a single leg or a leg system having more than three legs, the panhead according to the invention is ensured of having a sufficient shooting height when in use and can be made sufficiently compact when not in use.

POSSIBLE INDUSTRIAL APPLICATION

As described above, a panhead according to the invention is ensured of having a sufficient shooting height when in use and can be made sufficiently compact when not in use. Therefore, the invention is particularly suitable to be applied to a panhead on which great importance is placed on portability.

What is claimed is:

1. A panhead comprising:

a base body configured to be connected to the upper end portion of a leg system;

a rotational body which is provided as a part of the base body and which can be adjustably rotated around a horizontal rotation center axis;

an operating handle projecting from said rotational body and formed in the shape of a long bar extending in such a direction as to intersect with said rotation center axis of the rotational body, the operating handle being adapted to rotate, as an integral body with the rotational body, around the rotation center axis of the rotational body by receiving a given force when said rotational body is adjustably rotated; and a camera mount which is provided as a part of said rotational body and adapted to revolve, as an integral body with the rotational body, around said rotation center axis of the rotational body, wherein said rotational body has a body portion rotatably connected to the base body, and a projecting portion projecting upward from the body portion, said camera mount is attached to one side of said rotational body, the rotational body has a flat surface formed on the side opposite the surface from which the operating handle is projected, and the operating handle is positioned so that its lengthwise direction intersects with said flat surface at a right angle, and wherein when the camera mount is set at a first position by rotating said rotational body in one direction until the lengthwise direction of the operating handle intersects with the lengthwise direction of the leg system, the camera mount is at a given distance from a location directly above the base body towards the side from which said projecting portion projects, with at least a part of the camera mount being located higher than the upper end portion of the rotational body; and when the camera mount is set at a second position by rotating said rotational body in the other direction so that the operating handle and the leg system extend in parallel with each other, the camera mount is at a given distance from a location directly above the base body towards the side from which said projecting portion projects, with the entire camera mount being located lower than the upper end portion of the rotational body.

2. A panhead comprising:

a rotational body configured to rotate horizontally around a vertical axis and to rotate vertically around a horizontal axis, the rotational body having a flat slanting surface;

a camera mount connected to the rotational body so that the flat slanting surface of the rotational body slants with respect to a top surface of the camera mount; and an operating handle projecting from a back surface of the rotational body, the back surface being opposite from the flat slanting surface, and a longitudinal direction of the operating handle being perpendicular to the flat slanting surface, wherein when the camera mount is set at a first position by rotating vertically the rotational body around the horizontal axis in a first direction, at least a part of the camera mount is located higher than an upper end portion of the rotational body, and when the camera mount is set at a second position by rotating vertically the rotational body around the horizontal axis in a second direction opposite to the first direction, the entire camera mount is located lower than the upper end portion of the rotational body.

3. The panhead of claim 2, wherein the flat slanting surface of the rotational body is disposed at a horizontal position with respect to the vertical axis of the horizontal rotation of the rotational body when the camera mount is set at the second position.

* * * * *